Jan. 31, 1928.  1,657,511
F. LORENZ ET AL
GAME
Filed July 21, 1926  2 Sheets-Sheet 1
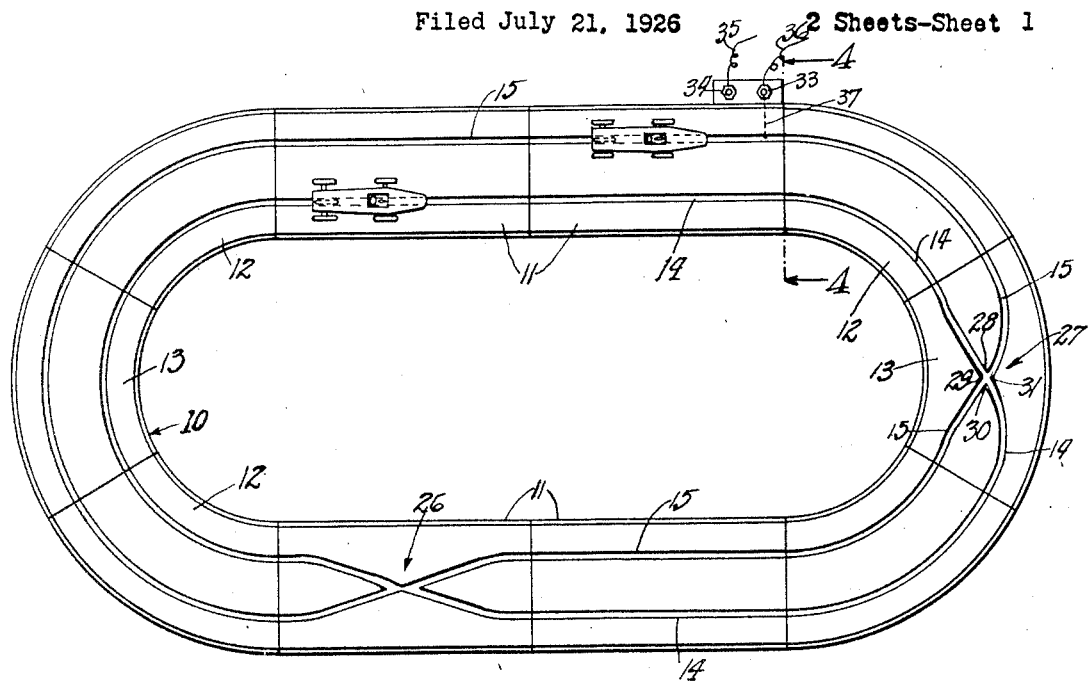
Fig.1
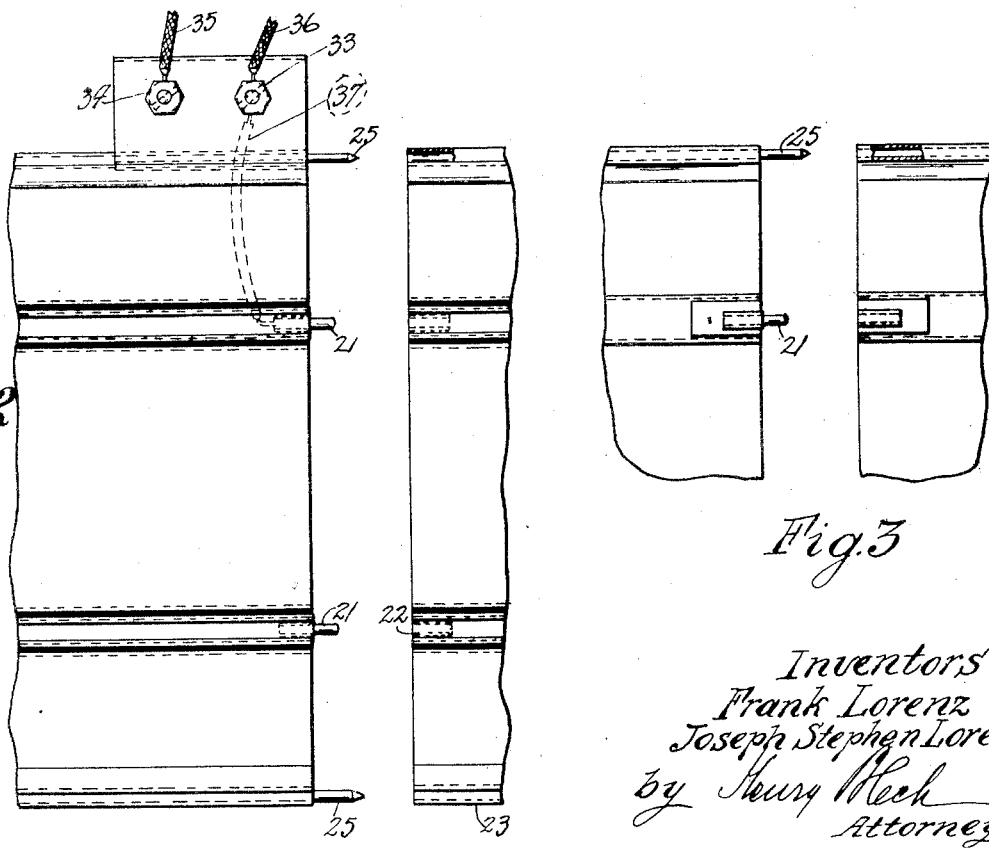
Fig.2
Fig.3
Inventors
Frank Lorenz
Joseph Stephen Lorenz
by Henry Hech
Attorney Jan. 31, 1928. 1,657,511
F. LORENZ ET AL
GAME
Filed July 21, 1926    2 Sheets-Sheet 2
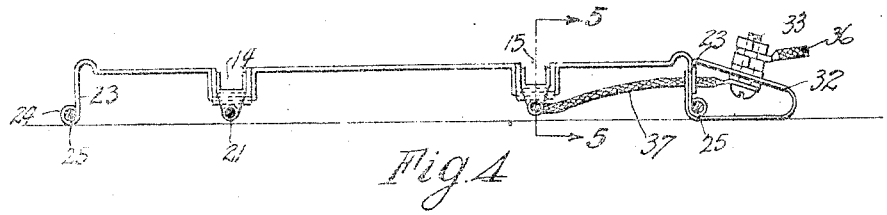
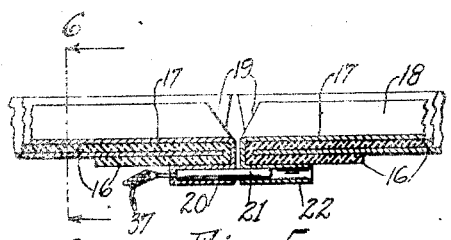
Fig. 5
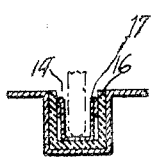
Fig. 6
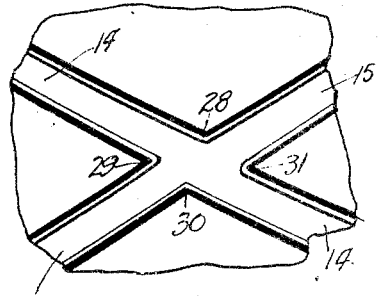
Fig. 7
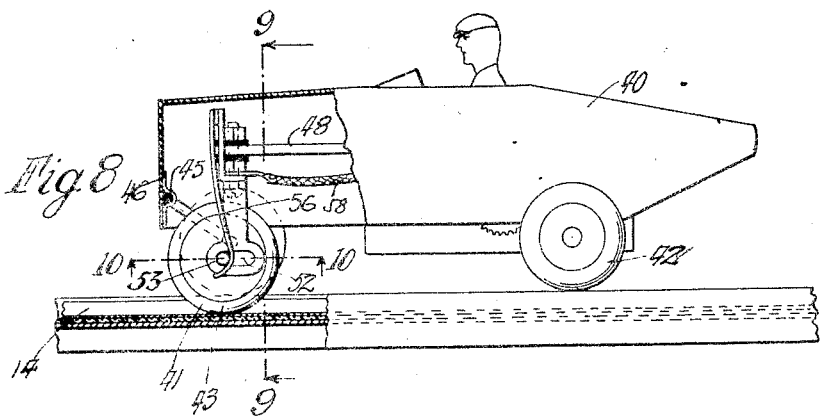
Fig. 8
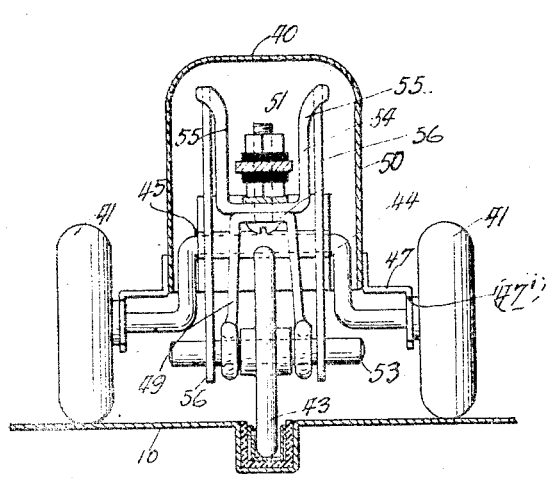
Fig. 9
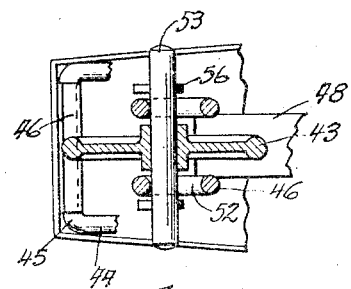
Fig. 10
Inventors
Frank Lorenz
Joseph Stephen Lorenz
by Henry Hech
Attorney.

Patented Jan. 31, 1928.

1,657,511

UNITED STATES PATENT OFFICE.

FRANK LORENZ AND JOSEPH STEPHEN LORENZ, OF CHICAGO, ILLINOIS.

GAME.

Application filed July 21, 1926. Serial No. 123,870.

The invention relates to games and more particularly to a game simulating an automobile race.

It is an object of the invention to provide a track for racing automobiles and electrical means for setting the automobiles in motion.

A further object aims at the provision of a track which insures continuous running of the automobiles.

A still further object aims at the provision of a pair of tracks having crossing portions designed to insure smoothness of running of the automobiles.

Another object aims at providing an automobile having a guide wheel capable of following the straight and curved portions of a track.

A still further object consists in providing means for returning the guide wheel to normal position subsequent to adjustment thereof by reason of track conditions.

With these and other equally important objects in view which will become apparent from a perusal of the invention, the latter comprises the means described in the specification, particularly pointed out in the claims forming a part thereof, and illustrated in the accompanying drawings, in which:

Fig. 1 is a plan view of a base provided with a plurality of tracks;

Fig. 2 is a fragmentary plan view of base sections adapted to be fitted together;

Fig. 3 is a fragmentary bottom plan view of base sections;

Fig. 4 is a section on the line 4—4 of Fig. 1;

Fig. 5 is a section on the line 5—5 of Fig. 4;

Fig. 6 is a detail section on the line 6—6 of Fig. 5;

Fig. 7 is a fragmentary plan view of a track crossing;

Fig. 8 shows partly in section, partly in elevation, an automobile constructed in accordance with our invention;

Fig. 9 is a section on the line 9—9 of Fig. 8; and,

Figure 10 is a section on the line 10—10 of Figure 8.

Referring to Figs. 1 to 7, 10 generally designates a base which comprises a plurality of sections 11, 12, 13, arranged to form the figure 0 so as to provide an endless path.

Each section is formed with depressions or grooves 14, 15, constituting tracks for the racing automobiles, as will hereinafter further appear. The grooves are lined with a layer of insulating material 16 such as rubber. To provide for electric traction, a conductor in the form of a U-member is placed on the lining 16. At the end of each section the side walls 18 of the plate are beveled as at 19 to prevent abutment of the said side walls of adjacent sections. At the end of the section the bottom of the member 17 is extended and bent back onto the insulating layer 16 at the bottom of grooves 14, 15. The extended portion is formed with a socket 20 enclosing a pin 21 which extends into a socket 22 formed on the extended and bent back bottom of the member 17 of the adjacent section as will be understood by reference to Fig. 5. The base 10 has vertical flanges 23 which are curled at the lower end as at 24 to receive pins 25 adapted to project with the curls of the flanges 23 of adjacent sections (Fig. 2).

The various sections when arranged to have their pins 21 and 25 enter the appertaining sockets of adjacent sections will form a closed figure so that the grooves 14, 15, constitute independent closed paths in which the guide wheels of the automobiles ride as will hereinafter be further explained.

If desired the paths may cross as at 26 and 27. In order to ensure that the wheel of the automobile always moves in the grooves, the corners 28, 29, 30 and 31 of the crossings of the grooves are arranged so that continuity of the path for the wheel is provided. As will appear from a reference to Fig. 7, the corner 31 is slightly offset with respect to corner 28 so that the wheel moving in groove 14 in counter clockwise direction will not strike corner 28, avoiding thereby the possibility that the wheel may jump the track. Again corner 30 is slightly offset toward the center of the base to avoid contact between the wheel and the opposing corner.

Current is supplied to the conductors 17 from the house wiring. To this end the base 10 is provided with a terminal casing 32 secured to the flange 23 and having two terminals 33 and 34 to which the wires 35 and 36 are secured. From the terminal 33 a wire 37 leads to the conductors 17 to supply current thereto.

The automobile used in connection with the game is an electrically driven vehicle and only such parts thereof will be described which are necessary for an understanding of the invention.

The automobile comprises a body 40 which is borne by front wheels 41 and rear wheels 42. Between the front wheels 41 a fifth wheel 43 is arranged which constitutes a guide or track wheel and is adapted to run in the groove 14 or 15.

The front wheels are mounted on a crank shaft 44, whose crank 45 is secured to the front wall of the body by a retaining member 46. The ends of the shaft extend through members 47 secured to the body and having vertical slots 47' so that the front wheels may execute a slight vertical movement about the crank 45 as axis. The track wheel 43 is supported from an arm 48 which projects forwardly from the motor mechanism of the automobile (not shown). To the arm is secured a U-member 49 whose cross part 50 is secured to arm 48 by a screw 51. The depending legs 51 of the U-member 49 have horizontal slots 52 for the passage of an axle 53 on which the track wheel 43 is fast. Superposed on the U-member 49 is a U-member 54, whose legs 55 extend upwardly. To the upper end of the legs 55 are secured leaf springs 56 whose lower ends are coiled around the axle 53.

From the foregoing follows that the track wheel may be shifted forwardly and rearwardly within the limits of slots 52 and in addition may be turned so that its axle 53 is out of parallelism with the shaft 44. The springs 56, however, return the shaft 53 to normal position after its displacement.

In use, two automobiles are placed with their guide or track wheels entering the tracks 14 and 15, respectively.

Current is supplied from the conductors 17 through the wheel 43 and thence through a wire 58 (Fig. 8) to the electric motor (not shown) of the automobile. The tracks 14 and 15 are of equal length and have crossed portions as hereinbefore described. The automobiles travel along the predetermined paths and the time of arrival at the starting point is carefully observed so that it may be established, which of the automobiles won the race. The front wheels are adapted to move in vertical direction so that the track wheel 43 always contacts with the conductor of the grooves. The adjustability of the track wheel 43 insures smooth running of the devices and the arrangement of the corners at the crossing of the track precludes the possibility of the wheel 43 jumping the track.

Thus the devices may run at considerable speed and afford a good reproduction of a race.

One of the running wheels of the automobile is of iron to afford contact with the base 10 so as to provide for the ground of the electric circuit.

While the drawing shows a preferred embodiment of the invention, numerous changes and alterations may be made without departing from the spirit of the invention. We, therefore, do not confine ourselves to the details of construction and arrangement as shown, but wish to include all changes, variations, rearrangements and revisions constituting departures within the scope of the invention as defined in the appended claims:

We claim:

1. In a game, a platform having a groove, an automobile adapted to run on said platform along said groove, said automobile having a crank shaft secured with the crank at the front end of the automobile body, and running wheels secured to the ends of said shaft.

2. In a game, a platform having a groove, and an automobile adapted to run on said platform along said groove, said automobile having a guide wheel provided between the front running wheels, said guide wheel being adapted to move about a vertical axis, and means for automatically restoring said guide wheel to normal position.

3. In a game, a platform having a groove, and an automobile adapted to run on said platform along said groove, said automobile having a guide wheel at the front thereof, means affording adjustment of said wheel about a vertical axis, and yielding means for restoring said wheel to normal position after adjustment.

4. In a game, a platform having a groove, and an automobile adapted to run on said platform along said groove, said automobile having a shaft and running wheels thereon, an auxiliary shaft parallel to said shaft, a guide wheel on said auxiliary shaft, means permitting said auxiliary shaft to deviate from its parallel position, and a plurality of springs tending to maintain said auxiliary shaft in parallel relation to the first named shaft.

5. A game, including a platform having an endless groove, comprising straight and curved arms, an automobile having a guide wheel in said groove, said guide wheel being adapted to follow the curvatures of said groove, and means for restoring the guide wheel to normal position for straight runs.

In witness whereof we affix our signatures.

FRANK LORENZ.
JOSEPH STEPHEN LORENZ.